United States Patent
Baratti et al.

(10) Patent No.: US 9,169,876 B2
(45) Date of Patent: Oct. 27, 2015

(54) BEARING UNIT FOR A VEHICLE WHEEL

(71) Applicant: Aktiebolaget SKF, Göteborg (SE)

(72) Inventors: Paolo Baratti, Turin (IT); Andrea Serafini, Pinerolo TO (IT)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/150,285

(22) Filed: Jan. 8, 2014

(65) Prior Publication Data
US 2014/0193108 A1 Jul. 10, 2014

(30) Foreign Application Priority Data
Jan. 8, 2013 (IT) .................. TO2013A0005

(51) Int. Cl.
| F16C 41/00 | (2006.01) |
| F16C 33/78 | (2006.01) |
| F16C 33/76 | (2006.01) |
| B60B 27/00 | (2006.01) |
| F16C 33/72 | (2006.01) |

(52) U.S. Cl.
CPC ......... F16C 33/7886 (2013.01); B60B 27/0005 (2013.01); B60B 27/0068 (2013.01); B60B 27/0073 (2013.01); F16C 33/723 (2013.01); F16C 33/762 (2013.01); F16C 33/768 (2013.01); F16C 41/007 (2013.01); *F16C 2326/02* (2013.01)

(58) Field of Classification Search
CPC .. F16C 41/007; F16C 33/723; F16C 33/7886; G01P 3/42; B60B 27/005; B60B 27/00068; B60B 27/0073

USPC .................. 384/448, 477, 489, 482; 324/173, 324/207.025; 277/353, 367, 394
See application file for complete search history.

(56) References Cited

U.S. PATENT DOCUMENTS

| 3,519,316 A | * | 7/1970 | Gothberg ....................... 384/486 |
| 3,767,279 A | * | 10/1973 | Hallerback .................... 384/539 |
| 3,770,992 A | * | 11/1973 | Veglia ........................... 384/489 |
| 4,408,809 A | * | 10/1983 | Walter et al. .................. 384/486 |
| 4,647,230 A | * | 3/1987 | Friedrich et al. .............. 384/510 |
| 4,864,231 A | * | 9/1989 | Okumura et al. ............. 384/448 |

(Continued)

FOREIGN PATENT DOCUMENTS

| EP | 1547814 A1 | 6/2005 |
| EP | 2620664 A1 | 7/2013 |

(Continued)

*Primary Examiner* — Marcus Charles
(74) *Attorney, Agent, or Firm* — Bryan Peckjian; SKF USA Inc. Patent Dept.

(57) ABSTRACT

A bearing unit for a vehicle wheel is provided having an axis of rotation and a radially outer stationary ring including a tubular axial lug delimited by an outer cylindrical surface, and with a flange transverse to the axis of rotation and axially delimited. A radially inner rotatable ring defines, with the ring, a space. An encoder is fixed to the inner ring and extends outside of the space and in front of the axial lug. A protective cover mounted on the axial lug to protect the encoder and close off the space. The stationary ring includes a shaped annular channel formed across the axial surface and delimited axially by a bottom surface and the side wall with a bent edge arranged axially in abutment against the bottom surface of the annular channel. Sealing means are arranged between the bent edge and the bottom surface to seal the annular channel.

4 Claims, 1 Drawing Sheet

(56) References Cited

U.S. PATENT DOCUMENTS

| | | | |
|---|---|---|---|
| 5,454,647 A * | 10/1995 | Otto | 384/486 |
| 5,603,575 A * | 2/1997 | Ouchi | 384/446 |
| 5,663,640 A * | 9/1997 | Sakamoto | 324/173 |
| 5,821,422 A * | 10/1998 | Ouchi | 73/514.39 |
| 5,873,658 A * | 2/1999 | Message et al. | 324/207.25 |
| 6,036,370 A * | 3/2000 | Kessen et al. | 384/448 |
| 6,190,051 B1 * | 2/2001 | Angelo et al. | 384/448 |
| 6,445,868 B1 * | 9/2002 | Grunbeck et al. | 385/138 |
| 6,692,153 B2 * | 2/2004 | Ohtsuki et al. | 384/448 |
| 6,877,903 B2 * | 4/2005 | Aiba et al. | 384/448 |
| 6,998,001 B2 * | 2/2006 | Woelfel | 156/78 |
| 7,618,191 B2 * | 11/2009 | Haepp et al. | 384/448 |
| 2003/0218457 A1 * | 11/2003 | Aiba et al. | 324/174 |
| 2004/0176522 A1 * | 9/2004 | Schaetzle et al. | 524/495 |
| 2005/0047693 A1 | 3/2005 | Niebling et al. | |
| 2006/0228062 A1 * | 10/2006 | Nagata et al. | 384/448 |
| 2011/0181101 A1 | 7/2011 | Sicilia et al. | |
| 2012/0294560 A1 * | 11/2012 | Heim et al. | 384/448 |

FOREIGN PATENT DOCUMENTS

| | | |
|---|---|---|
| JP | 2005321375 A | 11/2005 |
| JP | 2006258427 A | 9/2006 |
| JP | 2006284402 A | 10/2006 |
| JP | 2007010480 A | 1/2007 |
| JP | 2007198486 A | 8/2007 |
| JP | 2009216208 A | 9/2009 |

* cited by examiner

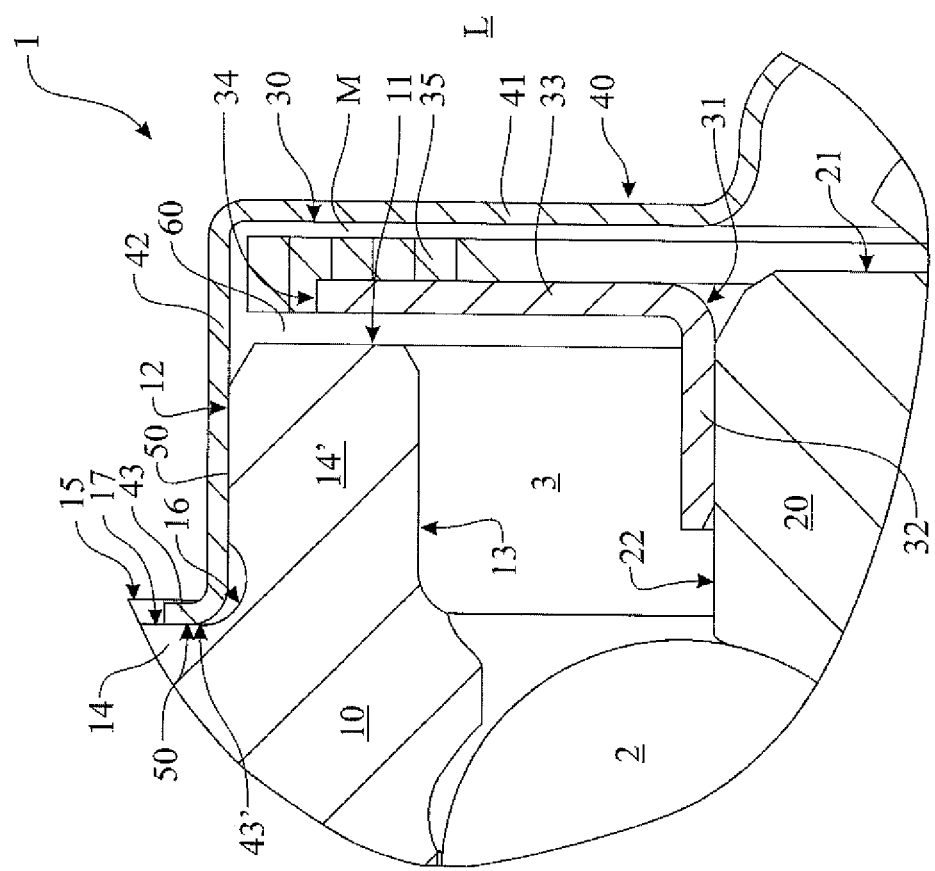

BEARING UNIT FOR A VEHICLE WHEEL

CROSS-REFERENCE TO RELATED APPLICATIONS

This application claims priority to Italian Patent Application No. TO2013A000005 filed Jan. 8, 2013, the content of which is herein fully incorporated by reference.

FIELD OF THE INVENTION

The present invention relates to a sealed bearing unit for a vehicle wheel.

BACKGROUND OF THE INVENTION

In most applications, an encoder is mounted entirely between the two rings inside the space, whereas, in the solution described above, the encoder extends outside of the space until it is positioned in front of the axial lug: since the protective cover is usually mounted on the outside of the outer ring and is normally arranged in axial abutment against an axial surface in front of the axial lug, the above-described positioning of the encoder prevents not only any axial abutment of the cover against the lug, but also the possibility to optimally control the distance between the cover and the encoder, with the risk of reducing the strength of the signal produced by the rotation of the encoder and picked up by a sensor which faces the encoder and is outside the cover.

Moreover, since it is no longer possible with the above-described configuration of the sensor to mount the cover in axial abutment against the lug of the outer ring, it is necessary to shape the cover differently to that presently known, running the further risk of no longer being able to precisely fit the cover on the lug, with the undesirable result that contaminants may possibly infiltrate between the cover and the outer ring, to the detriment of the insulation of the sensor and of the leaktightness of the unit.

SUMMARY OF THE INVENTION

It is an object of the present invention to provide a bearing unit for a vehicle wheel which makes it possible to overcome the disadvantages described above in an extremely simple and economical manner without having to make any substantial change to the process for mounting the bearing unit and without adopting particularly expensive devices.

The present invention provides a bearing unit for a vehicle wheel having the features defined in the accompanying claims.

BRIEF DESCRIPTION OF THE DRAWINGS

The invention will now be described with reference to the attached figure, which, in an axial section, shows a non-limiting exemplary embodiment.

DETAILED DESCRIPTION OF THE INVENTION

With reference to FIG. 1, 1 denotes as a whole a bearing unit for a vehicle wheel (not shown).

The unit 1 has an axis of rotation A and has a radially outer stationary ring 10 fixable to a strut (not shown) of the suspension of a vehicle; and a radially inner rotatable ring 20 arranged inside the ring 10 to rotate about the axis A and with respect to the ring 10 owing to the interposition of a plurality of rolling bodies 2 (only one of which is shown).

The unit 1 further comprises a phonic wheel 30 or magnetic encoder fixed to the inner ring 20 and a protective cover 40 made of non-ferromagnetic material mounted on the outer ring 10 so as to protect the encoder 30 and close off a space 3 formed between the two rings 10 and 20.

In particular, the outer ring 10 and the inner ring 20 are axially delimited on one side L of the unit 1 by respective axial annular surfaces 11 and 21 which are transverse to the axis of rotation A, of which the surface 11 is placed in a more axially inward position in the unit 1 relative to the surface 21. The outer ring 10 and the inner ring 20 are also radially delimited towards the outside by respective cylindrical surfaces 12 and 22, of which the surface 22, facing an inner cylindrical surface 13 of the outer ring 10, defines the space 3 between itself and the cylindrical surface 13.

The outer ring 10 is provided with an axial lug 14', called a spigot, which makes it easier to mount and centre the unit with the aforesaid strut like a wheel and is delimited radially by the surfaces 12 and 13 and axially by the surface 11, and with a mounting flange 14 (partially illustrated in the attached figure), which makes it possible to mount the unit 1 on the aforesaid strut and has an axial surface 15 which is transverse to the axis A and which can be placed in axial abutment against the aforesaid strut. The axial surface 15 is placed on the side of the flange 14 facing the tubular lug 14' that is towards the surface 12.

Moreover, the outer ring 10 is provided with a shaped annular channel 16, which is formed between the flange 14 and the annular lug 14' both in the cylindrical surface 12 and also in the axial surface 15, and is axially delimited on the side where the flange 14 is located by a bottom surface 17, which is parallel to the surface 15 and is transverse to the axis A.

The protective cover 40 is preferably, but not necessarily, made of non-ferromagnetic material and is mounted, preferably with interference, on the cylindrical surface 12 of the outer ring 10 so as to protect the encoder 30 and close off the space 3.

The cover 40 is cup-shaped with its concavity facing the space 3, and comprises an annular bottom wall 41 positioned transversely to the axis A in a position parallel to and facing the surfaces 11 and 21, and a cylindrical mounting wall 42, which is coaxial with the axis A, is integral with the annular bottom wall 41, and is mounted or fitted onto the surface 12. The cylindrical wall 42 comprises a free edge 43 which is bent radially outwards and is placed within the channel 16 so as to be axially in abutment against the bottom surface 17: since the axial distance between the bottom surface 17 and the surface 15 is greater than the thickness of the edge 43, this edge is placed entirely within the channel 16 and does not interfere with the operations of mounting the unit 1 on the aforesaid strut. In fact, when the unit 1 is coupled to the aforesaid strut, the cylindrical wall 42 is inserted into a cylindrical seat of the strut, and the flange 14 is placed in axial abutment against the strut in such a way that the surface 15 substantially adheres to the strut. The presence and position of the edge 43 with respect to the aforesaid strut also ensure that the cover 40 is retained in its mounting position.

The unit 1 is also provided with an annular compartment 60 which is delimited by the walls 41 and 42 and by the surface 11. The compartment 60 is isolated from the outside by the cover 40 and contains the encoder 30, which is fixed to the outer cylindrical surface 22 of the inner ring 20 and extends radially from the cylindrical surface 22 to a boundary in the proximity of the wall 42, in other words in the proximity of the cylindrical surface 12.

In particular, the encoder 30 comprises a flanged annular support 31, which is mounted on the cylindrical surface 22 and comprises, in turn, a tubular body 32 fitted onto the surface 22 and an annular flange 33 integral with the body 32 and extending radially from the body 32 towards the outside and towards the wall 42. The flange 33 is delimited, on the side opposite the body 32, by a cylindrical free terminal edge 34 which is substantially positioned so as to be radially equidistant from the surface 13 and from the surface 12, and in front of the surface 11; in other words, it is positioned within the compartment 60.

The encoder 30 further comprises a magnetized annular portion 35, which is integral with the flange 33 and is composed of a plurality of magnetic poles with opposing polarity, alternating with each other. Together with the wall 41 of the cover 40, the encoder 30 forms an annular gap M of very small axial dimensions, the size of which is determined substantially by the axial length of the wall 42 and by the contact between the edge 43 and the bottom surface 17 of the channel 16.

It is clear from the above description that the presence of the compartment 60 in the unit 1 allows the encoder 30 to extend radially well beyond the geometrical limit which would be imposed by the surface 13 in conventional bearing units, in which the encoders are placed entirely within the space 3. Therefore, since the encoder 30 can be extended freely until it reaches the maximum permitted diameter defined by the surface 12, it is possible to create an annular portion 35 having larger circumferential dimensions than those of the encoders of conventional bearing units.

In order to seal the channel 16, that is to prevent the infiltration of impurities and contaminants inside the cover 40, the unit 1 comprises sealing means (shown schematically in the attached figure and denoted by 50), which are arranged between the bent edge 43, that is between a front annular surface 43' thereof, and the bottom surface 17.

The sealing means 50 comprise a microencapsulated solid sealant, formed preferably by a precoat paint, which, before the cover 40 is mounted on the lug 14', that is assembled on the unit 10, is applied in a metered quantity alternatively either into the annular channel 16 and onto the bottom surface 17, or onto the surface 43' of the bent terminal edge 43. The choice between precoating the surface 17 or the surface 43' depends essentially on the mounting cycle and production cycle of the unit 10, and the microencapsulated solid sealant allows for ample freedom in both senses. The microencapsulated solid sealant does not react until the cover 40 is firmly fixed in position on the lug 14' and, in particular, until the two surfaces 17 and 43' are pressed against one another. Only when a pressing action is exerted between the surfaces 17 and 43' do the microcapsules break up, allowing the sealant to emerge and rapidly polymerize so as to form the seal on the channel 16.

To promote the polymerization, and depending on the application requirements and the mounting location, the microencapsulated solid sealant should preferably be of an anaerobic type, for example of a silicone type. Where possible, however, the microencapsulated solid sealant could preferably be of an aerobic type.

In spite of all the mounting devices, considering that the cover 40 is formed with the smallest possible thickness, above all in the wall 41, a generally discontinuous type of gap could possibly form between the cylindrical side wall 42 and the outer cylindrical surface 12: therefore, in the unlikely event that this gap does form, and in order to further seal in a leaktight manner this possible gap as well, the sealing means 50 (always shown schematically in the attached figure) are also preferably arranged between the cylindrical side wall 42 of the cover 40 and the axial lug 14'. In this case, the sealing means 50 comprise a microencapsulated solid sealant, which is formed preferably by a precoat paint and is applied in a metered quantity onto the inner side of the cylindrical side wall 42 before the cover 40 is mounted on the lug 14' that is assembled on the unit 10. Alternatively, the sealing means 50 can be applied always in a metered quantity but onto the surface 12 of the lug 14' before the cover 40 is mounted on said lug 14' that is assembled on the unit 10. The choice of where to apply the sealing means 50 before the cover 40 is assembled on the unit 10 depends on the productive cycle of the unit 10, on the type of movement of the components of the unit 10, and on the fact that the cover 40 can be mounted on the lug 14' along the production lines for the other components of the unit 10, that is can be mounted elsewhere.

Since the sealing means 50 are located in a virtually anaerobic environment once the cover 40 has been mounted on the lug 14', additionally owing to the sealing action provided by the sealing means 50 arranged between the surfaces 17 and 43', the microencapsulated solid sealant is therefore in this case of an anaerobic type, so as to allow for polymerization and solidification even in the absence of air.

As described above, the cover 40, that is the wall 42, is mounted with interference or fitted onto the surface 12 of the lug 14', and this mounting, together with the effect of the polymerization of the sealing means, especially even when said sealing means are arranged between the wall 42 and the surface 12, should protect against any accidental disassembly of said cover 40. However, the disassembly force of the cover 40, that is the force required to disassemble the cover 40, which is initially prevented substantially only by the interference with the lug 14' with the advantageous, but not crucial, contribution of the polymerization of the sealing means, can be crucially increased using sealing means 50 comprising microencapsulated solid sealants which also have adhesive properties to better resist pulling and shear stresses. These solid and adhesive sealants should always be of a silicone type, and should possibly also be acrylic-based, or methacrylate-based with anaerobic polymerization, and should possess, above all in the case in which they are applied onto the wall 42, a low coefficient of friction in mounting phases.

To expand the possible ways in which the cover 40 can be moved and the bearing unit 1 can be produced, as an alternative solution to the above-described microencapsulated solid sealants of the sealing means 50, the latter can be replaced by liquid sealants with or without greater adhesive properties in resistance to pulling and shear stresses. These liquid sealants can be used in all of the mounting solutions described above, and are advantageously used between the surfaces 17 and 43' especially when maximum precision is required in the mounting of the cover 40. In fact, even though a coating layer of solid sealant can also measure just a few microns, in some applications it is preferable to use a liquid sealant in microcapsules of which the thickness is certainly a few microns and does not influence the mounting of the cover 40, rather than a solid sealant in microcapsules of which the final thickness, once polymerized, might not be just a few microns.

It will be appreciated that the combined use of the bent free edge 43 arranged inside the channel 16 so as to be axially in abutment against the bottom surface 17 and the sealing means 50 (in their various forms described above) makes the production of the unit 10 not only completely flexible in terms of primarily the mounting of the cover 40, but also particularly precise, and also very reliable, even in the presence of a phonic wheel 30 arranged outside of the space 3.

The embodiments shown constitute only an example and are not to be regarded as limiting in any way the scope, the applicability or the configuration of the invention described above. The drawing and the detailed description above, instead, will provide persons skilled in the art with a convenient guide for implementing the invention, it being understood that various modifications may be made to the configuration of the elements described in the exemplary embodiments, without departing from the scope of the invention as defined in the accompanying claims and their legal equivalents.

The invention claimed is:

1. A bearing unit for a vehicle wheel, the bearing unit having an axis of rotation and comprising:
    a radially outer stationary ring provided with a tubular axial lug delimited by an outer cylindrical surface, and with a flange transverse to the axis of rotation and axially delimited, on the side where the tubular axial lug is located, by an axial front surface;
    a radially inner rotatable ring defining, together with the stationary ring, a space;
    an encoder fixed onto the inner ring and extending outside of the space and in front of the tubular axial lug; and
    a protective cover mounted on the tubular axial lug configured to protect the encoder and close off the space and having a side wall mounted on the outer cylindrical surface,
    wherein the stationary ring includes an annular channel formed across the axial surface and delimited axially by a bottom surface,
    wherein the side wall of the protective cover is provided with a bent edge arranged axially in abutment against the bottom surface of the annular channel,
    wherein sealing means are arranged between the bent edge and the bottom surface and configured to seal in a leak tight manner the annular channel, preventing the infiltration of impurities between the protective cover and the tubular axial lug, and
    wherein the sealing means are also arranged between the side wall of the protective cover and the tubular axial lug to seal further in a leak tight manner the cylindrical side wall on the outer cylindrical surface.

2. The bearing unit according to claim 1, wherein the sealing means includes a liquid sealant deposited and metered, before mounting of the protective cover, either into the annular channel or onto the bent edge.

3. The bearing unit according to claim 1, where the sealing means includes a solid sealant applied and metered, before mounting of the protective cover, either into the annular channel or onto the bent edge.

4. The bearing unit according to claim 1, wherein the sealing means also possess adhesive properties for fixing, at the same time as the sealing action, the protective cover on the tubular axial lug.

* * * * *